United States Patent
Omura et al.

(10) Patent No.: US 9,229,541 B2
(45) Date of Patent: Jan. 5, 2016

(54) COORDINATE DETECTION SYSTEM, INFORMATION PROCESSING APPARATUS AND METHOD, AND COMPUTER-READABLE CARRIER MEDIUM

(75) Inventors: Katsuyuki Omura, Tokyo (JP); Takanori Nagahara, Kanagawa (JP); Takefumi Hasegawa, Tokyo (JP)

(73) Assignee: RICOH COMPANY, LIMITED, Tokyo (JP)

( * ) Notice: Subject to any disclaimer, the term of this patent is extended or adjusted under 35 U.S.C. 154(b) by 293 days.

(21) Appl. No.: 13/369,864

(22) Filed: Feb. 9, 2012

(65) Prior Publication Data
US 2012/0206387 A1  Aug. 16, 2012

(30) Foreign Application Priority Data

Feb. 16, 2011 (JP) .................................. 2011-030430
Nov. 28, 2011 (JP) .................................. 2011-258458

(51) Int. Cl.
G06F 3/0354 (2013.01)
G06F 3/042 (2006.01)
G06F 3/0488 (2013.01)

(52) U.S. Cl.
CPC .......... *G06F 3/03545* (2013.01); *G06F 3/0423* (2013.01); *G06F 3/04883* (2013.01)

(58) Field of Classification Search
CPC .............. G06F 3/0421; G06F 3/03545; G06F 3/04883; G06F 3/0423
USPC .......... 345/175, 179; 178/19.04, 18.09, 18.01
See application file for complete search history.

(56) References Cited

U.S. PATENT DOCUMENTS 6,429,856 B1  8/2002  Omura et al.
6,608,619 B2  8/2003  Omura et al.
(Continued)

FOREIGN PATENT DOCUMENTS

CN  1797305 A     7/2006
CN  101424990 A   6/2009
(Continued)

OTHER PUBLICATIONS

Combined Chinese Office Action and Search Report issued Jun. 23, 2014 in Patent Application No. 201210034118.7 (with English language translation).
(Continued)

*Primary Examiner* — Lun-Yi Lao
*Assistant Examiner* — Ibrahim Khan
(74) *Attorney, Agent, or Firm* — Oblon, McClelland, Maier & Neustadt, L.L.P.

(57) ABSTRACT

A coordinate detection system includes a coordinate detecting apparatus that is mounted on a display apparatus, detects approach of an indicating object toward the display apparatus, detects a position coordinate of the indicating object on the display apparatus, and outputs a notice indicating the approach of the indicating object and the position coordinate; a contact detecting apparatus that detects whether the contact detecting apparatus is in contact with the coordinate detecting apparatus and outputs a notice indicating contact or non-contact of the contact detecting apparatus; and an information processing apparatus that includes a control unit that, upon reception of the notice indicating the approach of the indicating object, determines whether the notice indicating the contact of the contact detecting apparatus is received within a predetermined time, and issues an event indicating the contact of the contact detecting apparatus when receiving the notice of the contact of the contact detecting apparatus.

13 Claims, 8 Drawing Sheets

(56) References Cited

U.S. PATENT DOCUMENTS

| | | | |
|---|---|---|---|
| 2005/0110777 A1* | 5/2005 | Geaghan | G06F 3/042 345/179 |
| 2006/0109252 A1* | 5/2006 | Kolmykov-Zotov | G06F 3/03545 345/173 |
| 2008/0066972 A1* | 3/2008 | Abileah | G02F 1/13338 178/18.09 |
| 2008/0122803 A1* | 5/2008 | Izadi | G06F 3/0421 345/175 |
| 2009/0109187 A1 | 4/2009 | Noma | |
| 2010/0001963 A1* | 1/2010 | Doray | G06F 3/0317 345/173 |
| 2010/0051356 A1 | 3/2010 | Stern et al. | |
| 2010/0079413 A1* | 4/2010 | Kawashima | B60K 35/00 345/175 |
| 2010/0295806 A1 | 11/2010 | Homma et al. | |

FOREIGN PATENT DOCUMENTS

| | | |
|---|---|---|
| CN | 101893956 A | 11/2010 |
| JP | 2003-99199 | 4/2003 |
| JP | 2003-263274 A | 9/2003 |
| JP | 4627781 | 11/2010 |
| JP | 2010-277377 A | 12/2010 |

OTHER PUBLICATIONS

Extended European Search Report issued Apr. 9, 2015 in Patent Application No. 12155479.4.

Office Action mailed on Oct. 6, 2015 in Japanese Application No. 2011-258458.

* cited by examiner

COORDINATE DETECTION SYSTEM, INFORMATION PROCESSING APPARATUS AND METHOD, AND COMPUTER-READABLE CARRIER MEDIUM

CROSS-REFERENCE TO RELATED APPLICATIONS

The present application claims priority to and incorporates by reference the entire contents of Japanese Patent Application No. 2011-030430 filed in Japan on Feb. 16, 2011 and Japanese Patent Application No. 2011-258458 filed in Japan on Nov. 28, 2011.

BACKGROUND OF THE INVENTION

1. Field of the Invention

The present invention relates to a coordinate detection system, information processing apparatus and method, and a computer-readable carrier medium for identifying a type or a contact timing of an indicating object.

2. Description of the Related Art

Conventionally, an electronic whiteboard has been used at conferences, etc. in companies, educational institutions, governmental institutions, etc., that is provided with a large display for displaying images and that allows users to write or draw characters, numbers, or images including graphics on the display with an indicating object such as a stylus or a finger.

In recent years, as the above electronic whiteboard, for example, StarBoard (registered trademark) manufactured by Hitachi Solutions, Ltd. and Cyber Conference (registered trademark) manufactured by Pioneer Corporation have been provided. An electronic whiteboard equipped with an optical touch panel has also been proposed.

Japanese Patent Application Laid-open No. 2008-176802 discloses a coordinate input/detecting apparatus that is the electronic whiteboard equipped with the optical touch panel. The coordinate input/detecting apparatus includes light emitting units for emitting light that travels in an input region with a predetermined range; a reflecting unit that is arranged at a predetermined position on a peripheral portion of the input region; an intensity-distribution detecting unit that receives light emitted by each of the light emitting units and then reflected by the reflecting unit and that detects an intensity distribution of the received light; and a coordinate identifying unit that identifies, using the intensity distribution, the coordinate of a light blocking position at which the light traveling in the input region is blocked. In the coordinate input/detecting apparatus, a position coordinate of an indicating object is identified by a change in the intensity of light blocked by the indicating object.

In the coordinate input/detecting apparatus disclosed in Japanese Patent Application Laid-open No. 2008-176802, a finger or a stylus is used as the indicating object, and a contact timing of the indicating object is recognized by a change in the intensity of light blocked by the approaching indicating object.

There is a need for a coordinate detection system, an information processing apparatus, a method, and a computer-readable carrier medium capable of accurately identifying a type and a contact timing of an indicating object and improving drawing accuracy.

SUMMARY OF THE INVENTION

A coordinate detection system detects a coordinate contacted by an object. The coordinate detection system includes a coordinate detecting apparatus that is mounted on a display apparatus, detects approach of an indicating object toward the display apparatus, detects a position coordinate of the indicating object on the display apparatus, and outputs a notice indicating the approach of the indicating object and the position coordinate; a contact detecting apparatus that detects whether the contact detecting apparatus is in contact with the coordinate detecting apparatus and outputs a notice indicating contact or non-contact of the contact detecting apparatus with the coordinate detecting apparatus; and an information processing apparatus that includes a control unit that, upon reception of the notice indicating the approach of the indicating object, determines whether the notice indicating the contact of the contact detecting apparatus with the coordinate detecting apparatus is received within a predetermined time, and issues an event indicating the contact of the contact detecting apparatus with the coordinate detecting apparatus when receiving the notice of the contact of the contact detecting apparatus within the predetermined time.

An information processing apparatus performs a process on a coordinate detected by a coordinate detecting apparatus mounted on a display apparatus. The information processing apparatus includes a control unit that controls the coordinate detecting apparatus, receives an approach notice indicating approach of an indicting object from the coordinate detecting apparatus, determines whether a contact notice indicating contact of a contact detecting apparatus with the coordinate detecting apparatus is received within a predetermined time upon reception of the approach notice, and issues an event indicating the contact of the contact detecting apparatus with the coordinate detecting apparatus.

A method, which is implemented by an information processing apparatus to perform a process on a coordinate detected by a coordinate detecting apparatus, includes receiving an approach notice indicating approach of an indicating object from the coordinate detecting apparatus; determining whether a contact notice indicating contact of a contact detecting apparatus with the coordinate detecting apparatus is received within a predetermined time; and issuing an event indicating the contact of the contact detecting apparatus when the contact notice is received within the predetermined time.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained below. The present invention is not limited by the following embodiments.

Figure 1:
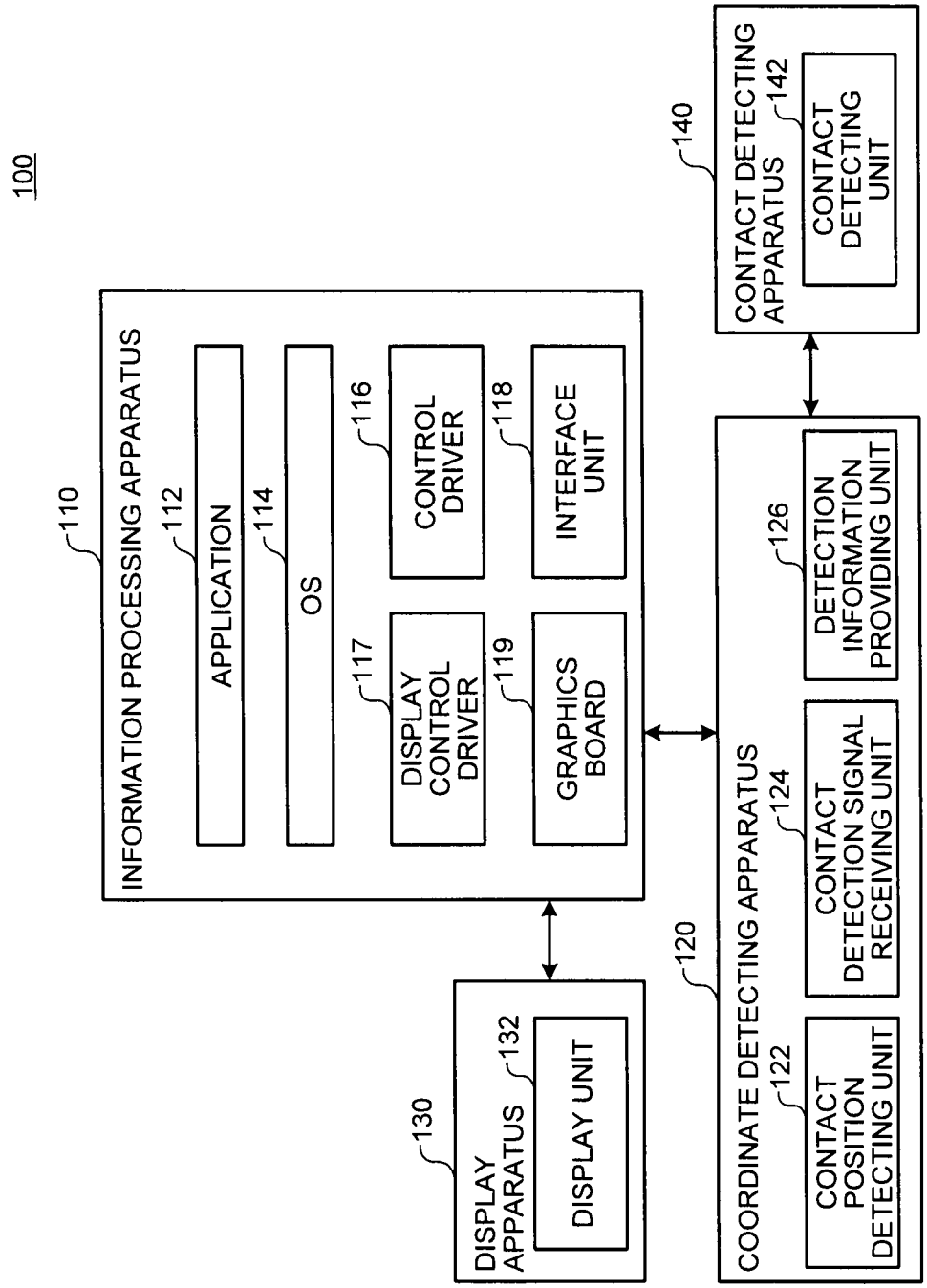
FIG. 1 is a diagram illustrating functional configurations of an information processing apparatus, a coordinate detecting apparatus, a display apparatus, and a contact detecting apparatus included in a coordinate detection system according to an embodiment.

FIG. 1 is a diagram illustrating functional configurations of an information processing apparatus 110, a coordinate detecting apparatus 120, a display apparatus 130, and a contact detecting apparatus 140 included in a coordinate detection system 100 according to an embodiment.

Figure 7:
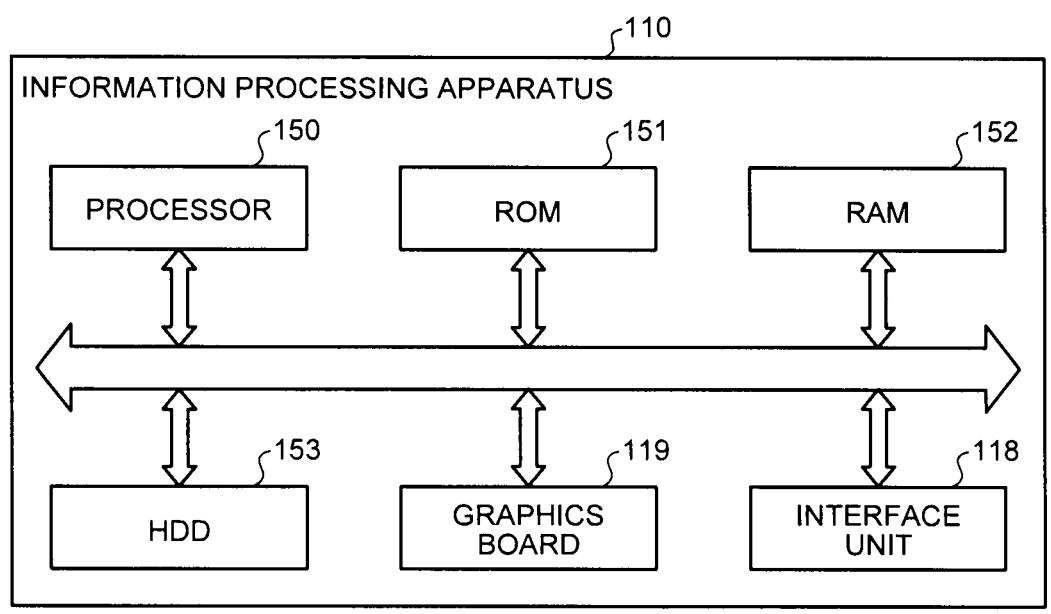
FIG. 7 is a diagram illustrating a hardware configuration of the information processing apparatus according to the embodiment.

The information processing apparatus 110 controls the coordinate detecting apparatus 120. The information processing apparatus 110 of the embodiment may be an information processing apparatus such as a desktop personal computer. As illustrated in FIG. 7, the information processing apparatus 110 includes a processor 150, such as a central processing unit (CPU) or a microprocessor unit (MPU), and executes a program of the embodiment that is written in a program language, such as an assembly language, C, C++, Java (registered trademark), PERL, RUBY, or PYTHON, under the management of an operating system (OS), such as WINDOWS (registered trademark) series, UNIX (registered trademark), LINUX (registered trademark), TRON, ITRON, μITRON, or Android (registered trademark).

As illustrated in FIG. 7, the information processing apparatus 110 also includes a read only memory (ROM) 151 as a nonvolatile memory for storing a boot program, such as BIOS; a random access memory (RAM) 152 for providing an execution space for executing the program of the embodiment; and a hard disk device (HDD) 153 for continuously storing data and the program of the embodiment. The information processing apparatus 110 realizes functional units described below by executing the program of the embodiment. The program of the embodiment can be distributed by being stored in a machine-readable recording medium, such as an HDD, a compact disc read only memory (CD-ROM), a magneto-optical (MO) disk, a flexible disk, an electrically erasable programmable read only memory (EEPROM), or an electrically programmable read only memory (EPROM), or may be transferred via a network in a format that is readable by other apparatuses.

In the embodiment illustrated in FIG. 1, the information processing apparatus 110 includes an application 112, an OS 114, a control driver 116, a display control driver 117, an interface unit 118, and a graphics board 119.

The application 112 is an application program for providing an image to be displayed on the coordinate detecting apparatus 120. The application 112 generates an image, provides the image to the display control driver 117 directly or via the OS 114, and causes the display apparatus 130 to display the image.

The application 112 receives, from the control driver 116, an event indicating contact, movement, or separation of an indicating object with respect to the coordinate detecting apparatus 120 mounted on the display apparatus 130, or receives a position coordinate of the indicating object, and executes a corresponding process. For example, when receiving an event indicating contact or movement of the indicating object, the application 112 changes a display color of an image indicated by a position coordinate on a display screen of the display apparatus 130 corresponding to the position coordinate of the indicating object, generates an image of a drawn character, symbol, or the like, and displays the image on the display apparatus 130 via the display control driver 117.

In the embodiments, various application programs can be used. Examples of the application programs include document editing software including Microsoft Word (registered trademark), spreadsheet software including Microsoft Excel (registered trademark), presentation software including Microsoft Power Point (registered trademark), or drawing software for drawing an image on the display apparatus 130.

The OS 114 is an operation system of the information processing apparatus 110. When receiving an image display command from the application 112, the OS 114 sends the received image together with the display command to the display control driver 117 and causes the display apparatus 130 to display the image.

The OS 114 displays a cursor at the position coordinate of the indicating object on the display screen of the display apparatus 130 in accordance with an event indicating contact, movement, or separation of the indicating object upon reception of the event from the control driver 116. When receiving an invent indicating contact or separation of the indicating object at the same or neighboring position coordinate, the OS 114 determines that an object, such as a menu bar or a radio button, displayed at the position coordinate is selected, and notifies the application 112 that the object is selected. When receiving the notice, the application 112 executes various processes corresponding to the selected object.

Figure 3A:
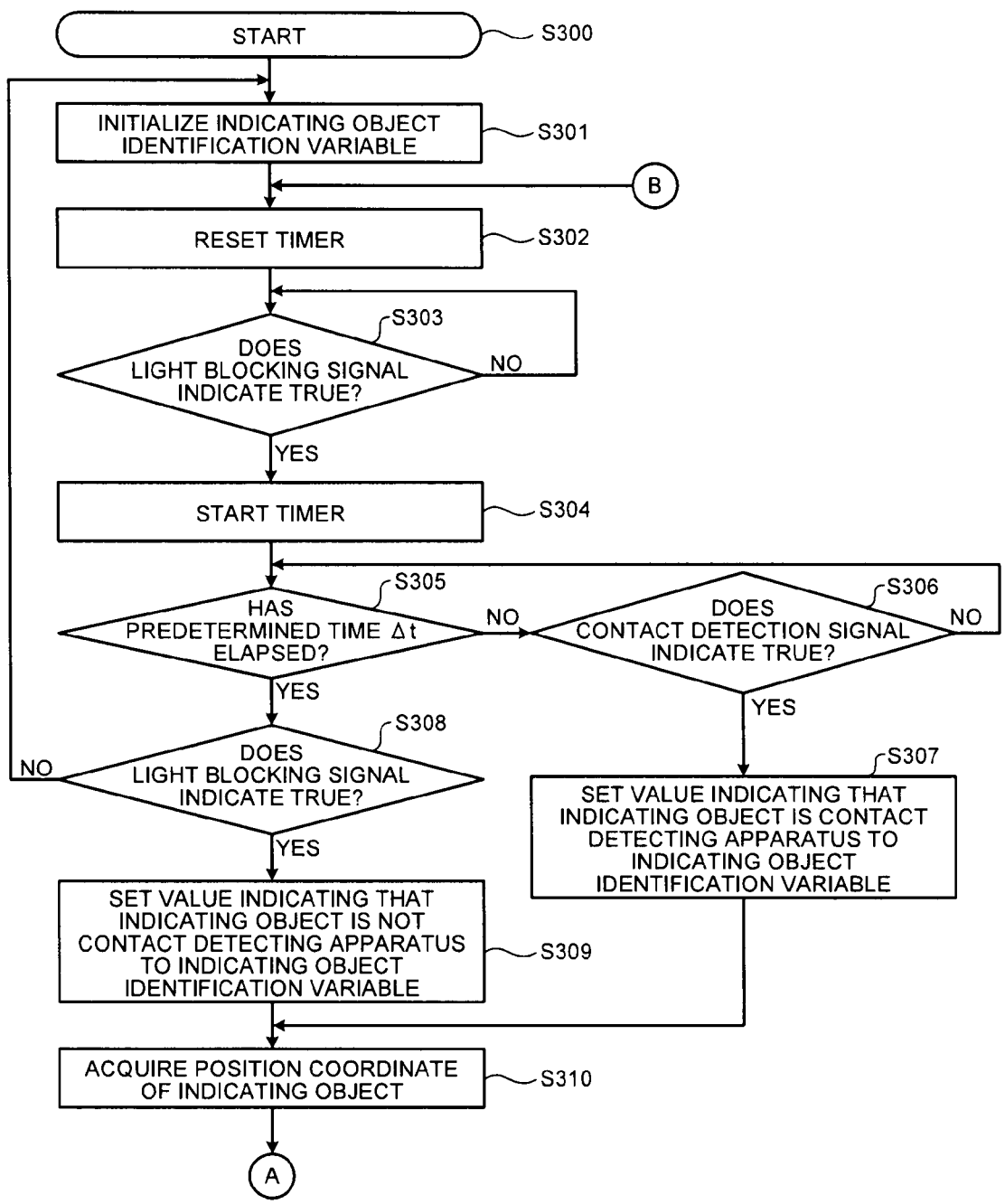
FIGS. 3A and 3B are flowcharts of a process performed by the information processing apparatus according to the embodiment.
Figure 3B:
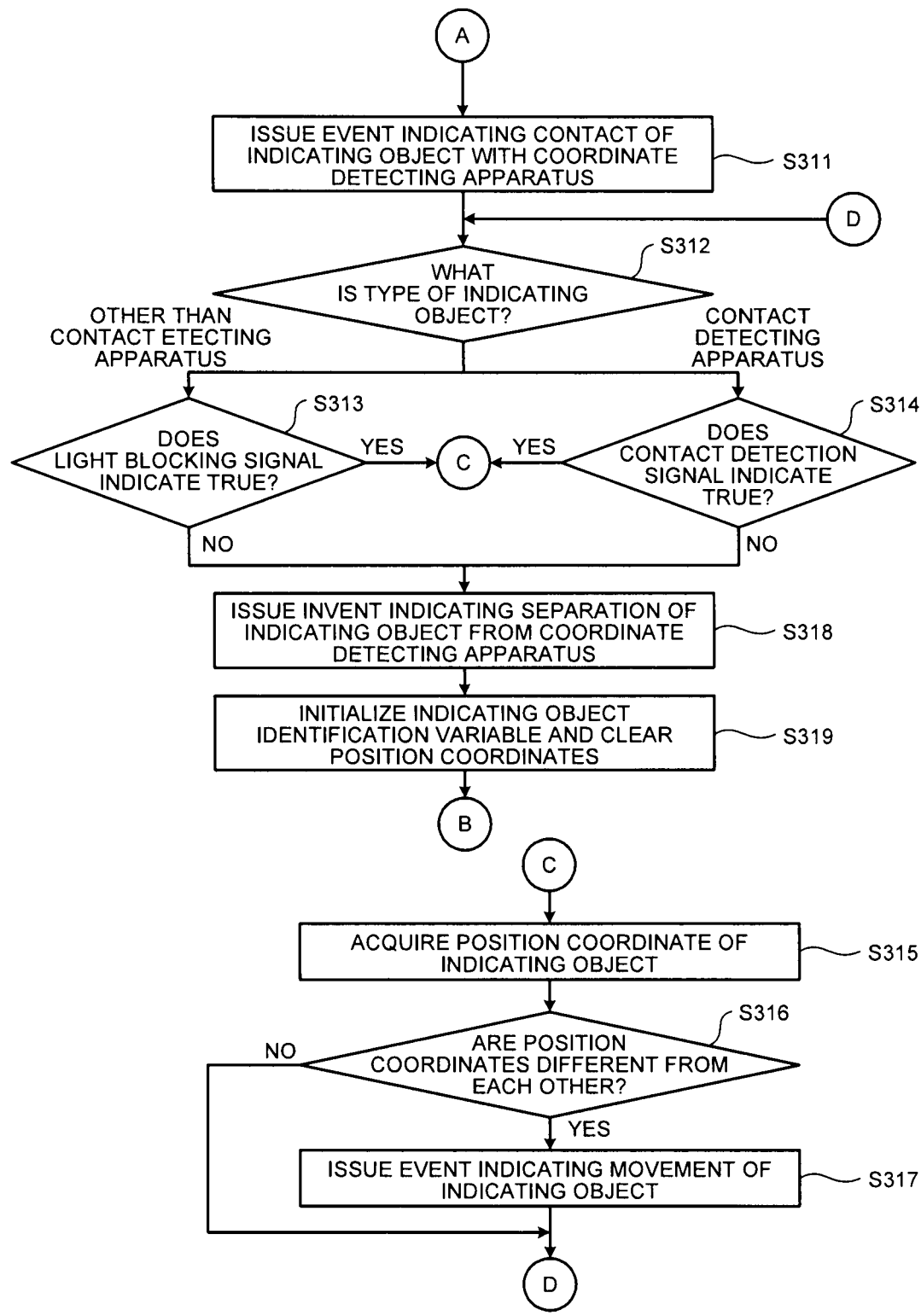

The control driver 116 is a functional unit that controls the coordinate detecting apparatus 120. The control driver 116 stores, as buffering, a light blocking signal, a position coordinate of the indicating object, and a contact detection signal, which are received from the coordinate detecting apparatus 120 and will be described below, in a storage device, such as a buffer memory, of the information processing apparatus 110. The control driver 116 executes a process to be explained below with reference to FIGS. 3A and 3B, issues various events to the OS 114, and provides the position coordinate of the indicating object on the display screen of the display apparatus 130, by using the light blocking signal, the position coordinate of the indicating object, and the contact detection signal. The control driver 116 separately performs the buffering and the process illustrated in FIGS. 3A and 3B.

The display control driver 117 is a functional unit that controls the graphics board 119 that controls images displayed on a display unit 132 of the display apparatus 130. The display control driver 117 receives, from the application 112 or the OS 114, an image to be displayed at the request of the application 112, writes the image in a video memory (not illustrated) of the graphics board 119, and causes the graphics board 119 to display the image on the display unit 132 of the display apparatus 130.

The interface unit 118 is a functional unit that exchanges data between the information processing apparatus 110 and the coordinate detecting apparatus 120. In the embodiment, a universal serial bus (USB) connector can be employed as the interface unit 118. The control driver 116 acquires various events and the position coordinate of the indicating object from the coordinate detecting apparatus 120 via a USB cable.

As another embodiment, the information processing apparatus 110 may use wireless communication compliant with various wireless communication protocol, such as Wi-Fi (registered trademark) or Bluetooth (registered trademark), to exchange images, various events, or data of the position coordinate of the indicating object between the information processing apparatus 110 and the coordinate detecting apparatus 120.

The graphics board 119 is a functional unit that controls an image to be displayed on the display unit 132 of the display apparatus 130. The graphics board 119 is connected to the display apparatus 130 via a video transmission cable, such as a video graphics array (VGA) cable, transmits an image, as a video signal, that is written in the video memory by the display control driver 117 to the display apparatus 130, and causes the display apparatus 130 to display the image.

The coordinate detecting apparatus 120 is installed on the display apparatus 130, detects whether an indicating object, such as the contact detecting apparatus 140, a finger, or a stylus, comes close thereto or comes in contact therewith, and detects a position coordinate of the indicating object. The coordinate detecting apparatus 120 includes a contact position detecting unit 122, a contact detection signal receiving unit 124, and a detection information providing unit 126.

The contact position detecting unit 122 detects a position coordinate of the indicating object, such as the contact detecting apparatus 140, on the display unit 132 of the display apparatus 130. In the embodiment, as in the coordinate detecting apparatus of an embodiment disclosed in Japanese Patent Application Laid-open No. 2008-176802, light scanners (not illustrated) are provided at two adjacent left and right corners of the display unit 132. The light scanners emit light while rotating, thereby outputting light beams that are approximately parallel to the display surface of the display unit 132. The light scanners receive light beams reflected and returned by a reflecting member arranged on the display unit 132. The contact position detecting unit 122 calculates a position coordinate of a light blocking point at which the light beams are blocked on the display unit 132, on the basis of waveform data that is a light reception result received from the light scanners.

Specifically, the contact position detecting unit 122 detects a peak point of the waveform data indicating a light intensity distribution received from the light scanners. The contact position detecting unit 122 calculates the position coordinate of the indicating object corresponding to the peak point, by using the following Expressions.

$$x = W \tan \theta R / (\tan \theta L + \tan \theta R)$$

$$y = W \tan \theta L \times \tan \theta R / (\tan \theta L + \tan \theta R)$$

In the above Equations, W is a distance between the two light scanners, θR is an angle between the indicating object and the light scanner on the right side, and θL is an angle between the indicating object and the light scanner on the left side. Details of a calculation method of the position coordinate are disclosed in Japanese Patent Application Laid-open No. 2008-176802.

As another embodiment, as in the coordinate detecting apparatus of another embodiment disclosed in Japanese Patent Application Laid-open No. 2008-176802, it is possible to arrange a plurality of pairs of a light emitting element and a light receiving element around the coordinate detecting apparatus 120 and calculate position coordinates of an indicating object on the basis of light reception results of the light receiving elements when the indicating object comes into contact with the coordinate detecting apparatus. In this case, the position coordinates of the indicating object identified by the blocked light, as the light reception results, on the light receiving elements correspond to the respective light receiving elements.

The contact position detecting unit 122 detects whether light is blocked by an indicating object approaching the coordinate detecting apparatus 120, on the basis of a change in the intensity of light received by the light scanners. The contact position detecting unit 122 generates the light blocking signal indicating whether light is blocked. The light blocking signal is transmitted from the detection information providing unit 126 to the information processing apparatus 110, together with the position coordinate of the indicating object calculated by the above method.

The contact detection signal receiving unit 124 is a functional unit that receives the contact detection signal indicating whether the contact detecting apparatus 140 is in contact with the coordinate detecting apparatus 120. When receiving the contact detection signal from the contact detecting apparatus 140, the contact detection signal receiving unit 124 notifies the detection information providing unit 126 of contact or non-contact. In the embodiment, the contact detection signal receiving unit 124 receives the contact detection signal from the contact detecting apparatus 140 via a signal line capable of communicating the contact detection signal. However, in another embodiment, it is possible to detect the contact detection signal via wireless communication using infrared or Bluetooth (registered trademark).

The detection information providing unit 126 provides the information processing apparatus 110 with detection information. The detection information providing unit 126 transmits the light blocking signal, the position coordinate of the indicating object, or the contact detection signal, as the detection information. In the embodiment, the detection information providing unit 126 simultaneously transmits the light blocking signal and the position coordinate of the indicating object. The detection information providing unit 126 periodically transmits the detection information. However, in another embodiment, it is possible to transmit the detection information when the light blocking signal is received and the position coordinate of the indicating object is calculated or when the contact detection signal is received from the contact detecting apparatus 140. Furthermore, in still another embodiment, the contact detecting apparatus 140 may directly transmit the contact detection signal to the information processing apparatus 110.

The display apparatus 130 displays an image provided by the information processing apparatus 110, and includes the display unit 132 for displaying the image. In the embodiment, a display, such as a plasma display, a liquid crystal display, an organic EL display, or a CRT display, may be used as the display apparatus. An image, such as a display screen, displayed on the display unit 132 contains a graphical user interface (GUI) provided by the application 112 of the information processing apparatus 110 or contains drawing images, such as characters, lines, symbols, or patterns, generated by the application 112 on the basis of the contact position detected by the coordinate detecting apparatus 120.

In the embodiment, the display apparatus 130 is structured as an apparatus separate from the information processing apparatus 110. However, in another embodiment, it is possible to employ an information processing apparatus, such as a notebook personal computer, having the display apparatus 130 and the information processing apparatus 110 that are integrated with each other.

The contact detecting apparatus 140 is an apparatus that detects a contact thereof with the coordinate detecting apparatus 120. The contact detecting apparatus 140 includes a contact detecting unit 142 for detecting whether the contact detecting apparatus 140 is in contact with an object. When detecting that the contact detecting apparatus 140 comes into contact with an object, the contact detecting unit 142 transmits the contact detection signal indicating the contact to the coordinate detecting apparatus 120.

Figure 2:
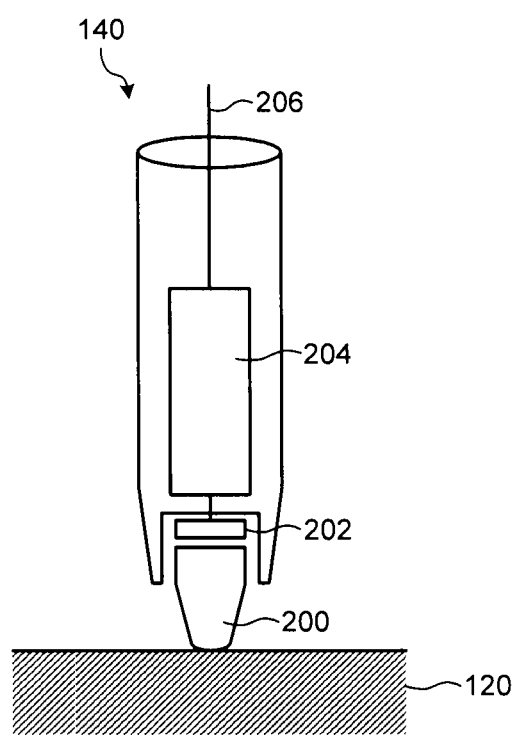
FIG. 2 is a diagram illustrating a hardware configuration of the contact detecting apparatus according to the embodiment.

FIG. 2 is a diagram illustrating a hardware configuration of the contact detecting apparatus according to the embodiment. In the following, the hardware configuration of the contact detecting apparatus 140 will be explained.

The contact detecting apparatus 140 includes a tip portion 200 as the contact detecting unit 142; a contact detection sensor 202; a contact determining unit 204; and a signal line 206.

The tip portion 200 is a movable member that comes into contact with the coordinate detecting apparatus 120 mounted on the display apparatus 130. When one end portion of the tip portion 200 comes into contact with an object, the tip portion 200 moves in the longitudinal direction of the contact detecting apparatus 140, so that the other end portion comes into contact with the contact detection sensor 202. An elastic member (not illustrated), such as a spring, is arranged between the tip portion 200 and the contact detection sensor 202. When the tip portion 200 comes away from the object, the tip portion 200 returns to the initial position because of a biasing force of the elastic member.

The contact detection sensor 202 is a sensor that detects contact of the tip portion 200. In the embodiment, a pressure sensor, such as FlexiForce (registered trademark) manufactured by Nitta Corporation or INASTOMER (registered trademark) manufactured by Inaba Rubber Co., Ltd, may be employed as the contact detection sensor 202. When the tip portion 200 comes into contact with the contact detection sensor 202, a resistance value of an electric current in the contact detection sensor 202 changes.

The contact determining unit 204 is a unit for monitoring the contact detection sensor 202 and determines whether the contact detecting apparatus 140 is in contact or not. In the embodiment, the contact determining unit 204 may be a semiconductor circuit, and includes a voltage conversion circuit, an analog-to-digital (A/D) conversion circuit, a memory circuit, a determination circuit, and an output circuit.

When the contact determining unit 204 detects a change in the resistance value of the contact detection sensor 202, the voltage conversion circuit converts the change in the resistance value of the contact detection sensor 202 into a voltage, and the A/D conversion circuit converts the voltage, which has been converted by the voltage conversion circuit, into an pressure signal.

The determination circuit compares a predetermined threshold stored in the memory circuit with the pressure signal, determines whether the tip portion 200 is in contact with an object, and outputs a determination result. In the embodiment, a change in the resistance value that occurs when the tip portion 200 actually comes into contact with an object is converted into a voltage, and the digitally-converted value is set as the predetermined threshold. Then, when the change in the resistance value is equal to or greater than the predetermined threshold, it is determined that the tip portion 200 is in contact with the object. On the other hand, when the change in the resistance value is smaller than the predetermined threshold, it is determined that the tip portion 200 is not in contact with the object.

The output circuit outputs, as the contact detection signal, a determination result calculated by the determination circuit to the coordinate detecting apparatus 120 via the signal line 206. The contact detection signal contains a value indicating contact (true) or non-contact (false) of the contact detecting apparatus 140 with an object. In the embodiment, the output circuit periodically outputs the contact detection signal. However, in another embodiment, the contact detection signal indicating contact may be output only when the determination circuit determines that the tip portion 200 is in contact with an object.

In the embodiment, the contact detection signal is transmitted to the coordinate detecting apparatus 120 via the signal line 206. However, in the other embodiments, the contact detection signal may be transmitted via wireless communication using infrared or Bluetooth (registered trademark). In still another embodiment, the contact detection signal may be transmitted directly to the information processing apparatus 110 via wireless communication or a dedicated line.

FIGS. 3A and 3B are flowcharts of a process performed by the information processing apparatus according to the embodiment. In the following, the process performed by the control driver 116 of the information processing apparatus 110 will be explained with reference to FIGS. 3A and 3B.

The process illustrated in FIGS. 3A and 3B starts at Step S300 in FIG. 3A. At Step S301, the control driver 116 initializes a variable for identifying a type of an indicating object (hereinafter, the variable is described as an "indicating object identification variable") that is temporarily stored in a storage device, such as a RAM or a register, of the information processing apparatus 110. At Step S302, the control driver 116 resets and initializes a timer that measures time. In the embodiment, a software timer implemented by a program or a hardware timer constructed of a timer circuit may be used as a time measuring unit.

At Step S303, the control driver 116 determines whether the latest light blocking signal, which is the latest at this step among the light blocking signals stored in the buffer memory, contains a value indicating blocking of light (true). When it is determined that the light is not blocked (NO), the process at Step S303 is repeated. On the other hand, when it is determined that the light is blocked (YES), the process goes to Step S304.

At Step S304, the control driver 116 starts the timer to measure time. At Step S305, the control driver 116 acquires the measured time from the timer and determines whether a predetermined time ($\Delta t$) has elapsed. In the embodiment, the predetermined time may be an average time from when the light is blocked by an indicating object approaching the coordinate detecting apparatus 120 to when a user actually brings the indicating object into contact with the display unit 132. The predetermined time may be written into a setting file or the like that can be referred to by the control driver 116, and the setting file may be installed into the information processing apparatus 110 or the control driver 116 as a program.

At the determination at Step S305, when it is determined that the predetermined time has not elapsed (NO), the process goes to Step S306. At Step S306, the control driver 116 determines whether the contact detection signal of the contact detecting apparatus 140 that is received from the coordinate detecting apparatus 120 contains a value indicating contact of the contact detecting apparatus 140 with an object (true). When the contact detection signal contains a value indicating non-contact of the contact detecting apparatus 140 with the object (false) (NO), the process returns to Step S305. On the other hand, when the contact detection signal contains a value indicating contact of the contact detecting apparatus 140 with the object (true) (YES), the process goes to Step S307. At Step S307, the control driver 116 sets a value indicating that the indicating object is the contact detecting apparatus 140 to the indicating object identification variable.

On the other hand, at the determination at Step S305, when it is determined that the predetermined time has elapsed (YES), the process goes to Step S308. At Step S308, the control driver 116 determines whether the latest light blocking signal, which is the latest at this step among the light blocking signals stored in the buffer memory, contains a value indicating blocking of light (true). When it is determined that the light is not blocked (NO), the process returns to Step S301. On the other hand, when it is determined that the light is blocked (YES), the process goes to Step S309. At Step S309, the control driver 116 sets a value indicating that the indicating object is not the contact detecting apparatus 140 to the indicating object identification variable.

At Step S310, the control driver 116 acquires, from the buffer memory, the latest position coordinate of the indicating object that is the latest at this step among the position coordinates stored in the buffer memory. At Step S311 in FIG. 3B, the control driver 116 issues an event indicating contact of the indicating object with the coordinate detecting apparatus 120. In the embodiment, the event contains the position coordinate of the indicating object acquired at Step S310.

At Step S312, the control driver 116 identifies the type of the indicating object by referring to the indicating object identification variable. When the indicating object is other than the contact detecting apparatus, the process goes to Step S313. On the other hand, when the indicating object is the contact detecting apparatus, the process goes to Step S314.

At Step S313, the control driver 116 determines whether the latest light blocking signal, which is the latest at this step among the light blocking signals stored in the buffer, contains a value indicating blocking of light (true). When it is determined that the light is blocked (YES), the process goes to Step S315. On the other hand, when it is determined that the light is not blocked, i.e., when the indicating object is separate from the coordinate detecting apparatus 120 (NO), the process goes to Step S318.

At Step S314, the control driver 116 determines whether the latest contact detection signal, which is the latest at this step among the contact detection signals stored in the buffer memory, contains a value indicating contact of the contact detecting apparatus 140 with the object (true). When it is determined that the contact detecting apparatus 140 is in contact with the object (YES), the process goes to Step S315. On the other hand, when it is determined that the contact detecting apparatus 140 is not in contact with the object (NO), i.e., when the indicating object is separate from the coordinate detecting apparatus 120 (NO), the process goes to Step S318.

At Step S315, the control driver 116 acquires, from the buffer memory, the latest position coordinate of the indicating object that is the latest at this step among the position coordinates stored in the buffer memory. At Step S316, the control driver 116 determines whether the position coordinate acquired at Step S310 and the position coordinate acquired at Step S315 are different from each other. In the embodiment, the position coordinate acquired at Step S310 is temporarily stored in the storage device, such as a RAM or a register, so that the position coordinate can be compared with the position coordinate acquired at Step S315.

At the determination at Step S316, when it is determined that the position coordinates are different from each other, i.e., when the position coordinate of the indicating object at the time of previous contact and the position coordinate of the indicating object at the time of subsequent contact are different from each other (YES), the process goes to Step S317. At Step S317, an event indicating that the indicating object has moved is issued, and the process returns to Step S312. In the embodiment, the event contains the position coordinate of the indicating object acquired at Step S315.

On the other hand, when it is determined that the position coordinates are the same at the determination at Step S316, i.e., when the position coordinate of the indicating object at the time of previous contact and the position coordinate of the indicating object at the time of subsequent contact are the same (NO), the process returns to Step S312. Then, when the indicating object identification variable specified at Step S307 or at Step S309 indicates an object other than the contact detecting apparatus, the process goes to Step S313. On the other hand, when the indicating object identification variable indicates the contact detecting apparatus, the process goes to Step S314.

At Step S318, the control driver 116 issues an event indicating separation of the indicating object from the coordinate detecting apparatus 120. At Step S319, the control driver 116 initializes the indicating object identification variable and clears the position coordinates stored in the storage device. Then, the process returns to Step S302 and the above processes are repeated.

In the embodiment described above, the event issued at Step S311 is "an event indicating contact of the indicating object with the coordinate detecting apparatus". However, in another embodiment, it is possible to issue "an event indicating contact of the contact detecting apparatus" or "an event indicating contact of an object other than the contact detecting apparatus" by referring to the indicating object identification variable just before the process at Step S311.

Furthermore, the "event indicating separation of the indicating object from the coordinate detecting apparatus" issued at Step S318 may be issued as different events, such as "an event indicating separation of the contact detecting apparatus from the coordinate detecting apparatus" and "an event indicating separation of an object other than the contact detecting apparatus from the coordinate detecting apparatus", on the basis of the determination at Step S312. For example, different events indicating touch with a dedicated pen and touch with a finger may be issued separately so that a write function can be realized with use of the dedicated pen and an erase function can be realized with use of the finger.

In the embodiment, the information processing apparatus 110 determines whether the contact detection signal indicating contact of the contact detecting apparatus 140, which is the indicating object, with the coordinate detecting apparatus 120 is received within a predetermined time after reception of the light blocking signal indicating blocking of light, i.e., within an average time taken for a user to bring the indicating object into contact with the coordinate detecting apparatus 120 after the light is blocked. Therefore, the information processing apparatus of the embodiment can accurately determine whether the indicating object used for drawing images is the contact detecting apparatus 140 or an indicating object other than the contact detecting apparatus 140 when the user draws characters or the like on the coordinate detecting apparatus 120. Consequently, when the contact detecting apparatus 140, whose contact or non-contact with the coordinate detecting apparatus 120 is accurately detectable, is being used as the indicating objet, it is possible to prevent a case that the contact detecting apparatus 140 is erroneously detected as a different indicating object. As a result, it is possible to accurately detect contact or non-contact with the coordinate detecting apparatus 120, enabling to improve the drawing accuracy in details of characters, such as a hook, to be drawn.

Figure 4A:
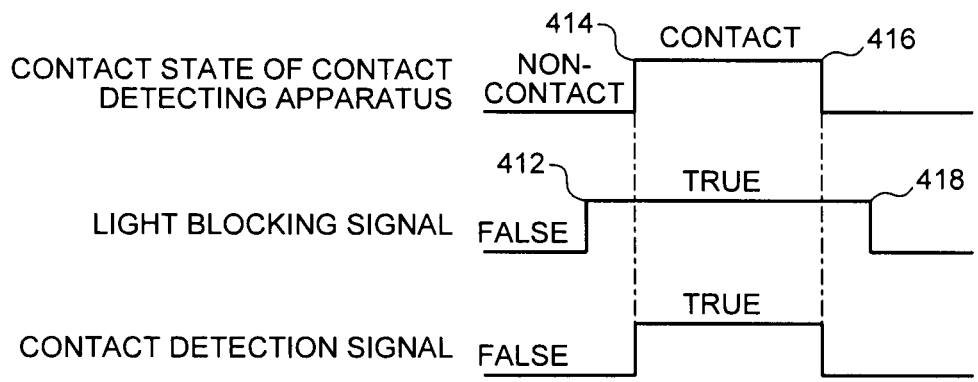
FIGS. 4A and 4B are timing diagrams illustrating output timings of a light blocking signal and a contact detection signal that are output from the coordinate detecting apparatus to the information processing apparatus when an indicating object comes into contact with the coordinate detecting apparatus according to the embodiment.
Figure 4B:
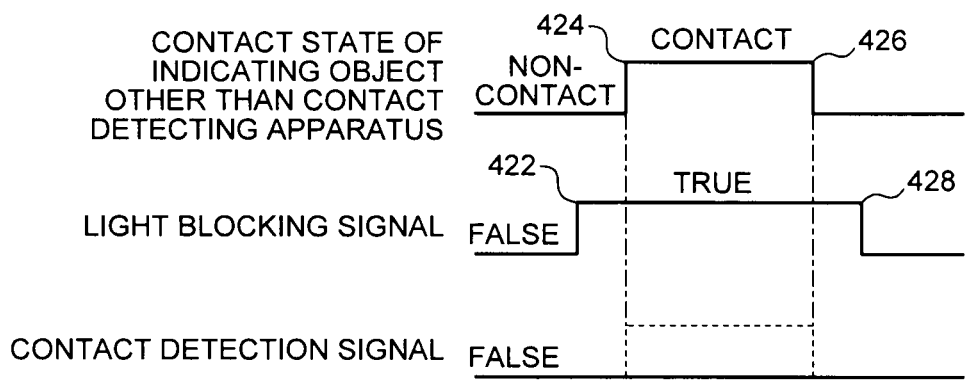

FIGS. 4A and 4B are timing diagrams illustrating output timings of the light blocking signal and the contact detection signal that are output from the coordinate detecting apparatus to the information processing apparatus when an indicating object comes into contact with the coordinate detecting apparatus according to the embodiment. In the following, an explanation is given of, with reference to FIGS. 4A and 4B, the output timings of the light blocking signal and the contact detection signal that are output when the contact detecting apparatus 140 or the indicating object other than the contact detecting apparatus 140 comes into contact with the coordinate detecting apparatus 120.

FIG. 4A illustrates the output timings and the states of the light blocking signal and the contact detection signal that are output by the coordinate detecting apparatus 120 when the contact detecting apparatus 140 comes into contact with the coordinate detecting apparatus 120.

In the example illustrated in FIG. 4A, the light blocking signal, which contains a value of "false" indicating non-blocking of light, and the contact detection signal, which contains a value of "false" indicating non-contact of the contact detecting apparatus with an object, are output before the contact detecting apparatus 140 approaches the coordinate detecting apparatus 120.

When the contact detecting apparatus 140 approaches the coordinate detecting apparatus 120, the light blocking signal containing a value of "true" indicating blocking of light is output at a time point 412 in FIG. 4A. Subsequently, when the contact detecting apparatus 140 comes into contact with the coordinate detecting apparatus 120, the contact detection signal containing a value of "true" indicating contact of the contact detecting apparatus with the object is output at a time point 414.

When the contact detecting apparatus 140 is separate from the coordinate detecting apparatus 120, the contact detection signal containing a value of "false" indicating non-contact of the contact detecting apparatus with the object is output at a time point 416. Subsequently, when the contact detecting apparatus 140 further comes away from the coordinate detecting apparatus 120, the light blocking signal containing a value of "false" indicating non-blocking of light is output at a time point 418.

FIG. 4B illustrates the output timings and the states of the light blocking signal and the contact detection signal that are output by the coordinate detecting apparatus 120 when an indicating object other than the contact detecting apparatus 140, e.g., a finger, comes into contact with the coordinate detecting apparatus 120.

In the example illustrated in FIG. 4B, similarly to the example illustrated in FIG. 4A, the light blocking signal, which contains a value of "false" indicating non-blocking of light, and the contact detection signal, which contains a value of "false" indicating non-contact of the finger with an object, are output before the finger approaches the coordinate detecting apparatus 120.

When the finger approaches the coordinate detecting apparatus 120, the light blocking signal containing a value of "true" indicating blocking of light is output at a time point 422 in FIG. 4B. Subsequently, the finger comes into contact with the coordinate detecting apparatus 120 at a time point 424 and thereafter comes away from the coordinate detecting apparatus 120 at a time point 426. At this time, the contact detection signal containing a value of "false" indicating non-contact of the finger with the object. Thereafter, when the finger further comes away from the coordinate detecting apparatus 120, the light blocking signal containing a value of "false" indicating non-blocking of light is output at a time point 428.

Figure 5A:
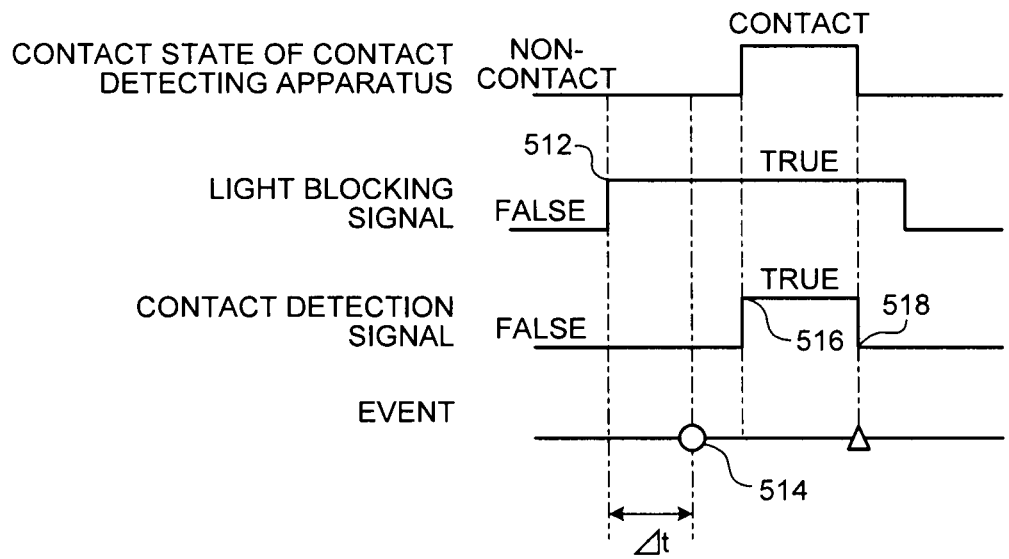
FIGS. 5A and 5B are timing diagrams illustrating a timing at which the information processing apparatus according to the embodiment issues an event.
Figure 5B:
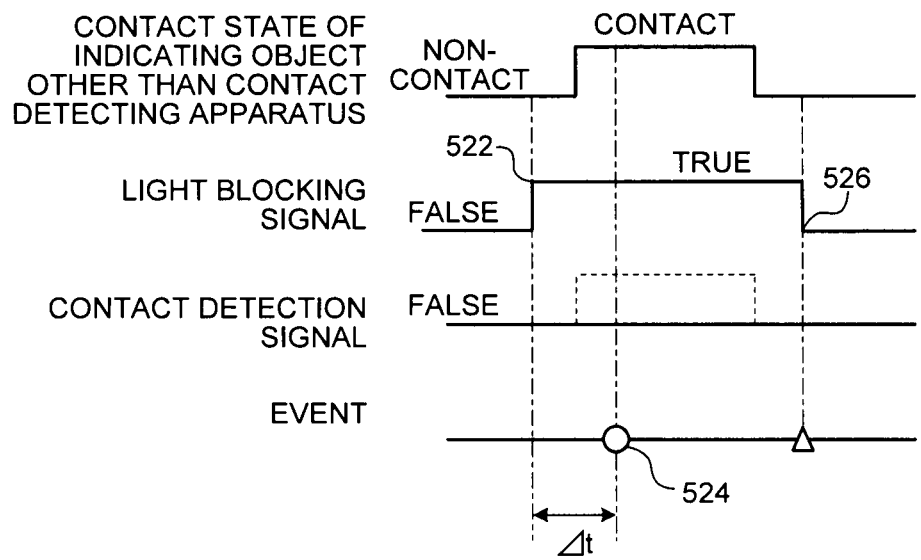

FIGS. 5A and 5B are timing diagrams illustrating a timing at which the information processing apparatus according to the embodiment issues an event. In the following, an explanation is given of, with reference to FIGS. 5A and 5B, an event issuance timing that is applied when the information processing apparatus 110 does not receive the contact detection signal indicating contact of the contact detecting apparatus 140 within a predetermined time after reception of the light blocking signal indicating blocking of light from the coordinate detecting apparatus 120.

FIG. 5A illustrates an event issuance timing that is applied when the information processing apparatus 110 receives the light blocking signal indicating blocking of light and the contact detection signal indicating contact of the contact detecting apparatus 140 after lapse of the predetermined time (Δt).

In the example illustrated in FIG. 5A, the information processing apparatus 110 receives the light blocking signal indicating blocking of light at a time point 512 and starts measuring time. When the information processing apparatus 110 does not receive the contact detection signal indicating contact of the contact detecting apparatus 140 within the predetermined time (Δt) after the start of measurement of time, the information processing apparatus 110 issues an event indicating contact of an indicating object with the coordinate detecting apparatus 120 at a time point 514 at which the predetermined time (Δt) ends.

Thereafter, when the contact detecting apparatus 140 comes into contact with the coordinate detecting apparatus 120, the information processing apparatus 110 receives the contact detection signal indicating contact of the contact detecting apparatus 140 at a time point 516. When the contact detecting apparatus 140 is separate from the coordinate detecting apparatus 120 and the information processing apparatus 110 receives the contact detection signal indicating separation of the contact detecting apparatus 140, the information processing apparatus 110 issues an event indicating separation of the indicating object from the coordinate detecting apparatus 120 at a time point 518.

FIG. 5B illustrates an event issuance timing that is applied when the information processing apparatus 110 receives the light blocking signal indicating blocking of light but does not receive the contact detection signal indicating contact of the contact detecting apparatus 140 even after lapse of the predetermined time (Δt).

In the example illustrated in FIG. 5B, the information processing apparatus 110 receives the light blocking signal indicating blocking of light at a time point 522 and starts measuring time. Similarly to the example illustrated in FIG. 5A, when the information processing apparatus 110 does not receive the contact detection signal indicating contact of the contact detecting apparatus 140 within the predetermined time (Δt) after the start of measurement of time, the information processing apparatus 110 issues an event indicating contact of an indicating object with the coordinate detecting apparatus 120 at a time point 524 at which the predetermined time (Δt) ends.

Thereafter, when the information processing apparatus 110 does not receive the contact detection signal indicating contact of the contact detecting apparatus 140 but receives the light blocking signal indicating non-blocking of light, the information processing apparatus 110 issues an event indicating separation of the indicating object from the coordinate detecting apparatus 120 at a time point 526 at which the light blocking signal is received.

Figure 6:
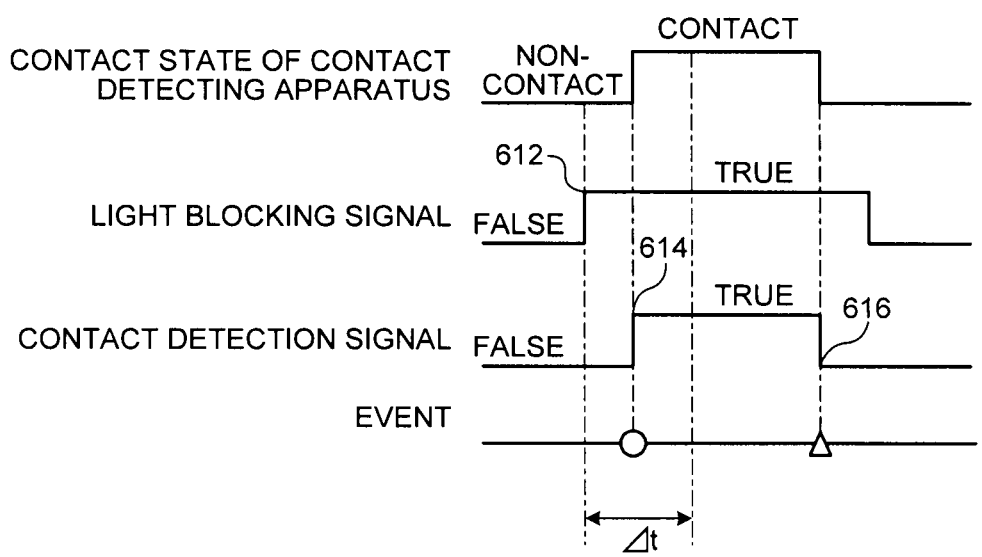
FIG. 6 is a diagram illustrating a timing at which the information processing apparatus according to the embodiment issues an event.

FIG. 6 is a diagram illustrating a timing at which the information processing apparatus according to the embodiment issues an event. In the following, an explanation is given of, with reference to FIG. 6, an event issuance timing that is applied when the information processing apparatus 110 receives the contact detection signal indicating contact of the contact detecting apparatus 140 within a predetermined time after reception of the light blocking signal indicating blocking of light from the coordinate detecting apparatus 120.

FIG. 6 illustrates an event issuance timing that is applied when the information processing apparatus 110 receives the light blocking signal indicating blocking of light and also receives the contact detection signal indicating contact of the contact detecting apparatus 140 within the predetermined time (Δt).

In the example illustrated in FIG. 6, the information processing apparatus 110 receives the light blocking signal indicating blocking of light at a time point 612 and starts measuring time. When receiving the contact detection signal indicating contact of the contact detecting apparatus 140 within the predetermined time (Δt) after the start of measurement of time, the information processing apparatus 110 issues an event indicating contact of the indicating object with the coordinate detecting apparatus 120 at a time point 614 at which the contact detection signal is received.

When receiving the contact detection signal indicating separation of the contact detecting apparatus 140 from the coordinate detecting apparatus 120, the information processing apparatus 110 issues an event indicating separation of the indicating object from the coordinate detecting apparatus 120 at a time point 616 at which the contact detection signal is received.

As described above, the coordinate detection system according to the embodiment includes a coordinate detecting apparatus that detects a position coordinate of an indicating object; an information processing apparatus that performs a processes on the coordinate detected by the coordinate detecting apparatus; a display apparatus that displays an image provided from the information processing apparatus; and the contact detecting apparatus. The coordinate detecting apparatus is mounted on the display unit, detects approach of the indicating object toward the display apparatus, detects the position coordinate of the indicating object, and outputs a notice indicating the approach of the indicating object and the position coordinate.

The information processing apparatus includes an application that provides an image to be displayed on the display apparatus; and a control driver that controls the coordinate detecting apparatus. When receiving a notice indicating approach of an indicating object, the control driver determines whether a notice indicating contact of a contact detecting apparatus is received within a predetermined time. When receiving the notice within the predetermined time, the control driver determines that the contact detecting apparatus is the indicating object that is in contact with the coordinate detecting apparatus, and issues an event indicating the contact of the contact detecting apparatus.

Therefore, the coordinate detection system according to the embodiment can accurately identify a type of the indicating object that is used for drawing images on the coordinate detecting apparatus, i.e., whether the indicating object is the contact detecting apparatus. As a result, it is possible to accurately recognize a contact timing, enabling to improve the drawing accuracy.

According to one aspect of the present invention, it is possible to provide an information processing apparatus, a method, and a computer program product capable of accurately identifying a type of an indicating object and improving the drawing accuracy.

The present invention can be implemented in any convenient form, for example using dedicated hardware, or a mixture of dedicated hardware and software. The present invention may be implemented as computer software implemented by one or more network processing apparatus. The network can comprise any conventional terrestrial or wireless communications network, such as the Internet. The processing apparatus can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implemental on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A coordinate detection system that detects a coordinate contacted by an object, the coordinate detection system comprising:

a coordinate detecting apparatus that is mounted on a display apparatus, includes a light emitting unit that emits light to the display apparatus, detects approach of an indicating object toward the display apparatus based upon whether the light emitted from the light emitting unit is blocked by the indicating object, detects a position coordinate of the indicating object on the display apparatus, and outputs a notice indicating the approach of the indicating object and the position coordinate;

a contact detecting apparatus that detects whether the contact detecting apparatus is in contact with the coordinate detecting apparatus and outputs a notice indicating contact or non-contact of the contact detecting apparatus with the coordinate detecting apparatus; and an information processing apparatus that includes:
a control unit that
when the notice indicating the contact of the contact detecting apparatus with the coordinate detecting apparatus is received within a predetermined time beginning from the notice indicating the approach of the indicating object, determines that the indicating object is the contact detecting apparatus and issues a first event, and when the notice indicating the contact of the contact detecting apparatus with the coordinate detecting apparatus is not received within the predetermined time, determines that the indicating object is an object other than the contact detecting apparatus and issues a second event; and an application unit that
when the control unit issues the first event, displays an image on the display apparatus based on the position coordinate output from the coordinate detecting apparatus, and
when the control unit issues the second event, deletes an image displayed on the display apparatus based on the position coordinate output from the coordinate detecting apparatus.

2. The coordinate detection system according to claim 1, wherein
when the control unit receives the notice indicating the contact within the predetermined time, the control unit issues the first event indicating the contact of the contact detecting apparatus with the coordinate detecting apparatus, and
when the control unit does not receive the notice indicating the contact within the predetermined time, the control unit issues the first event indicating the contact of the contact detecting apparatus with the coordinate detecting apparatus after a lapse of the predetermined time.

3. The coordinate detection system according to claim 2, wherein
the control unit determines whether a subsequent notice indicating contact of the contact detecting apparatus with the coordinate detecting apparatus is received,
when the control unit receives the subsequent notice, the control unit determines whether a position coordinate that is previously received and a position coordinate that is received with the subsequent notice are different from each other, and
when the position coordinates are different from each other, the control unit issues a third event indicating movement of the contact detecting apparatus.

4. The coordinate detection system according to claim 3, wherein
the first and third events contain a position coordinate of the contact detecting apparatus, and
when the control unit receives the first event indicating the contact of the contact detecting apparatus with the coordinate detecting apparatus or the third event indicating the movement of the contact detecting apparatus, the application unit generates the image at the position coordinate and provides the image to the display apparatus.

5. The coordinate detection system according to claim 1, wherein the coordinate detecting apparatus detects the approach of the indicating object toward the display apparatus before the coordinate detecting apparatus is actually contacted.

6. The coordinate detection system according to claim 1, wherein when the control unit does not receive the notice indicating the contact of the contact detecting apparatus with the coordinate detecting apparatus within the predetermined time, the control unit issues the second event at the time the predetermined time lapses.

7. An information processing apparatus that performs a process on a coordinate detected by a coordinate detecting apparatus mounted on a display apparatus that includes a light emitting unit that emits light to the display apparatus, the information processing apparatus comprising:
a control unit that
controls the coordinate detecting apparatus,
receives an approach notice indicating approach of an indicating object from the coordinate detecting apparatus based upon whether the light emitted from the light emitting unit is blocked by the indicating object,
determines whether or not a contact notice indicating contact of a contact detecting apparatus with the coordinate detecting apparatus is received within a predetermined time beginning from reception of the approach notice,
when the contact notice is received within the predetermined time, determines that the indicating object is the contact detecting apparatus and issues a first event, and
when the contact notice is not received within the predetermined time, determines that the indicating object is an object other than the contact detecting apparatus and issues a second event; and an application unit that
when the control unit issues the first event, displays an image on the display apparatus based on the coordinate detected by the coordinate detecting apparatus, and
when the control unit issues the second event, deletes an image displayed on the display apparatus based on the coordinate detected by the coordinate detecting apparatus.

8. The information processing apparatus according to claim 7, wherein
when the control unit receives the notice indicating the contact within the predetermined time, the control unit issues the first event indicating the contact of the contact detecting apparatus with the coordinate detecting apparatus, and
when the control unit does not receive the notice indicating the contact within the predetermined time, the control unit issues the first event indicating the contact of the contact detecting apparatus with the coordinate detecting apparatus after a lapse of the predetermined time.

9. The information processing apparatus according to claim 8, wherein
the control unit determines whether a subsequent notice indicating contact of the contact detecting apparatus with the coordinate detecting apparatus is received,
when the control unit receives the subsequent notice, the control unit determines whether a position coordinate that is previously received and a position coordinate that is received with the subsequent notice are different from each other, and
when the position coordinates are different from each other, the control unit issues a third event indicating movement of the contact detecting apparatus.

10. The information processing apparatus according to claim 9, further comprising:
the first and third events contain a position coordinate of the contact detecting apparatus, and
when the control unit receives the first event indicating the contact of the contact detecting apparatus with the coordinate detecting apparatus or the third event indicating the movement of the contact detecting apparatus, the application unit generates the image at the position coordinate and provides the image to the display unit.

11. The information processing apparatus according to claim 7, wherein the approach notice indicates the approach of the indicting object before coordinate detecting apparatus is actually contacted.

12. A method implemented by an information processing apparatus to perform a process on a coordinate detected by a coordinate detecting apparatus, the method comprising:

receiving an approach notice indicating approach of an indicating object from the coordinate detecting apparatus based upon whether light emitted from a light emitting unit emitting the light to a display apparatus is blocked by the indicating object;

determining whether or not a contact notice indicating contact of a contact detecting apparatus with the coordinate detecting apparatus is received within a predetermined time beginning from reception of the approach notice;

determining that the indicating object is the contact detecting apparatus and issuing a first event when the contact notice is received within the predetermined time;

determining that the indicating object is an object other than the contact detecting apparatus and issuing a second event when the contact notice is not received within the predetermined time;

displaying an image on the display apparatus based on the coordinate detected by the coordinate detecting apparatus when the first event is issued; and deleting an image displayed on the display apparatus based on the coordinate detected by the coordinate detecting apparatus when the second event is issued.

13. A non-transitory computer-readable medium having computer-readable program codes embodied in the medium, the program codes when executed causing a computer to execute the method according to claim 12.

* * * * *